United States Patent [19]

Tsuji

[11] Patent Number: 4,929,068

[45] Date of Patent: May 29, 1990

[54] CONVERSION LENS

[75] Inventor: Sadahiko Tsuji, Kanagawa, Japan

[73] Assignee: Canon Kabushiki Kaisha, Tokyo, Japan

[21] Appl. No.: 411,203

[22] Filed: Sep. 21, 1989

Related U.S. Application Data

[63] Continuation of Ser. No. 89,750, Aug. 27, 1987, abandoned.

[30] Foreign Application Priority Data

| | | | |
|---|---|---|---|
| Sep. 1, 1986 | [JP] | Japan | 61-205644 |
| Sep. 1, 1986 | [JP] | Japan | 61-205645 |
| Sep. 1, 1986 | [JP] | Japan | 61-205646 |
| Sep. 1, 1986 | [JP] | Japan | 61-205647 |
| Sep. 1, 1986 | [JP] | Japan | 61-205648 |
| Sep. 1, 1986 | [JP] | Japan | 61-205649 |

[51] Int. Cl.[5] ........................ G02B 15/02; G02B 13/18; G02B 9/12; G02B 9/60

[52] U.S. Cl. .................................... 350/422; 350/432; 350/465; 350/474; 350/477

[58] Field of Search ........................ 350/422, 432–435, 350/453, 465, 474, 477

[56] References Cited

U.S. PATENT DOCUMENTS

| | | | |
|---|---|---|---|
| 3,094,580 | 6/1963 | Rosier | 350/453 |
| 3,319,553 | 5/1967 | Vogel | 350/422 |
| 4,394,071 | 7/1983 | Yamada | 350/422 |
| 4,768,868 | 9/1988 | Wakamiya et al. | 350/422 X |

*Primary Examiner*—Scott J. Sugarman

*Attorney, Agent, or Firm*—Fitzpatrick, Cella, Harper & Scinto

[57] ABSTRACT

A front conversion lens is disclosed comprising, from front to rear, a first lens unit made of glass material, a second lens unit made of plastic material, and a third lens unit made of glass material.

17 Claims, 4 Drawing Sheets

CONVERSION LENS

This application is a continuation of application Ser. No. 089,750 filed Aug. 27, 1987, now abandoned.

BACKGROUND OF THE INVENTION:

1. Field of the Invention:

This invention relates to front conversion lenses attachable to the front of a photographic lens to change the focal length of the entire photographic system, and more particularly to conversion lenses of reduced weight in the entire lens system with a high optical performance suited for use in photographic cameras or video cameras.

2. Description of the Related Art:

There have been proposed front conversion lenses which, when attached to the photographic lens at the front, extend the focal length of the entire photographic system while maintaining constant the position of the focal plane of the entire system, for example, in Japanese Laid-Open patent application Nos. SHO 55-32046 and SHO 59-204817.

The telephoto conversion lens has, in most cases, two lens units of which the front is positive in refractive power and the rear is negative, and the wide-angle conversion lens has, in most cases, two lens units of which the front is negative in refractive power and the rear is positive. The entirety of these two lens units constitutes an afocal system. Therefore, applicant uses the term unit as equivalent to the term group, since the art recognizes that both the terms unit and group may mean one or more optical elements, having an identified optical function. In the simplest form, therefore, the lens system can be constructed by the combination of two lenses of positive and negative powers.

However, the conversion lens for attachment to the front of the photographic lens tends to increase the size of the entire lens system as compared with the rear conversion lens, and it tends to be very heavy. It is, therefore, very difficult to achieve a minimization of the size and weight of the whole of the conversion lens in such a manner as to preserve good optical performance.

A good compromise between the requirements of minimizing the diameter of the front member of the conversion lens and of stabilizing good correction of chromatic aberrations, particularly lateral chromatic aberration, is generally obtained when the front and rear lens units are constructed and arranged in such a way that the air separation therebetween is made so short, preferably, as if it were filled with glass material.

On this account, a lens design that most of the conventional high performance conversion lenses have employed is such that a plurality of lenses are used in constructing each of the front and rear lens units with the result that the air separation between both units becomes short.

Hence, the use of the prior known lens design for improving the optical performance of the conversion lens has resulted in a great increase of the weight with a great inconvenience to handling it.

In order to reduce the weight of the whole of the conversion lens, all the lens elements of the conversion lens may be made of plastic materials. This idea has found its use in some of the commerically available items. However, because plastic has weak physical strengths, and since as with the conversion lens, the attaching and detaching is frequently repeated, the possibility of damaging the lens system particularly at the exposed lens surface to the atmosphere is very high, constituting a cause of lowering the optical performance.

SUMMARY OF THE INVENTION:

A first object of the present invention is to achieve a great reduction of the weight of a conversion lens.

A second object is to provide a front conversion lens the lens surface of which is less likely to be scarred and having a high optical performance.

The present invention is provides a lens design wherein the front conversion lens comprises, from front to rear, a first lens unit made of glass material, a second lens unit made of plastic material and of which the lens thickness is greatest, and a third lens made of glass material.

Further objects of the invention will become apparent from the following description of embodiments thereof by reference to the drawings.

Figure 1A:
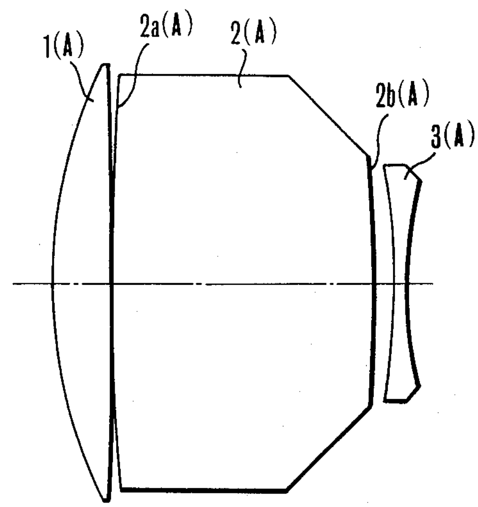
FIGS. 1(A), 1(B) and 1(C) are longitudinal section views of three examples of telephoto conversion lenses of the invention.
Figure 1B:
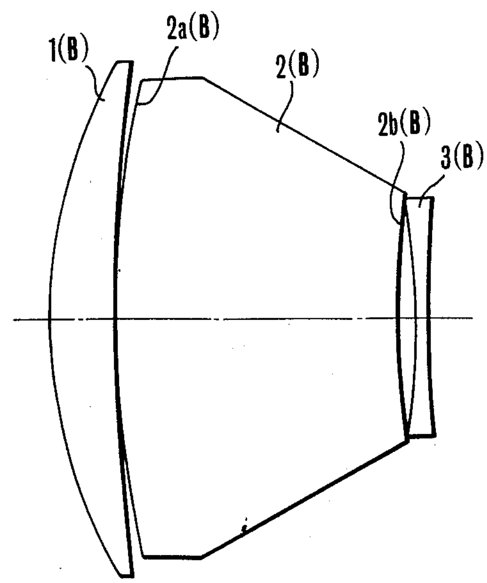
Figure 1C:
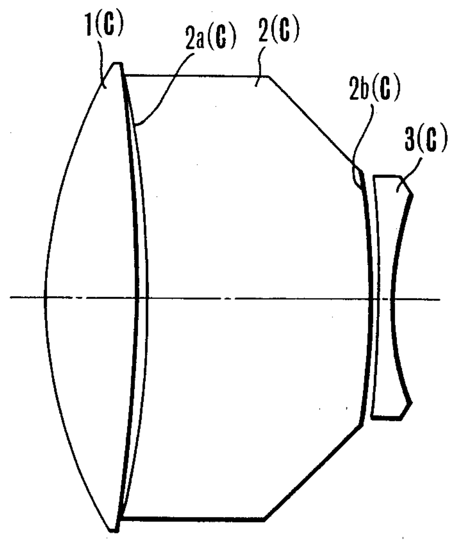
Figure 2A:
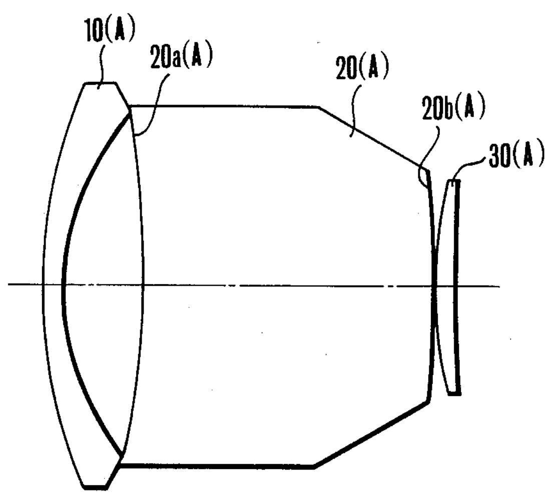
FIGS. 2(A), 2(B) and 2(C) are longitudinal section views of three examples of wide-angle conversion lenses of the invention.
Figure 2B:
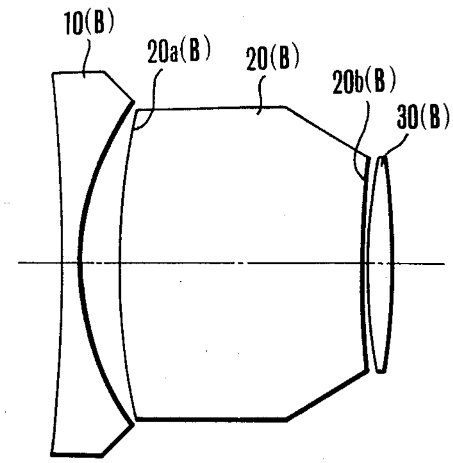
Figure 2C:
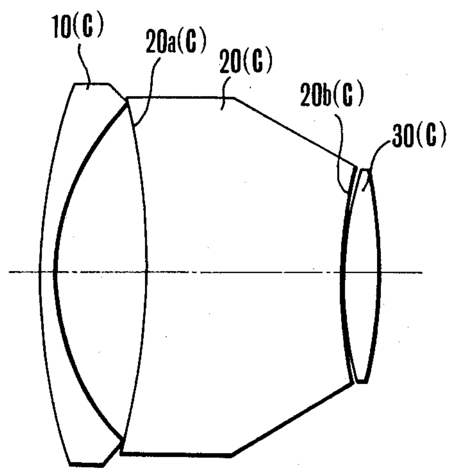

DETAILED DESCRIPTION OF THE PREFERRED EMBODIMENTS:

In FIGS. 1(A) to 2(C) there is shown an embodiment of the invention with the respective specific front conversion lenses. FIGS. 1(A) to 1(C) represent the telephoto conversion lens system, and FIGS. 2(A) to 2(C) represent the wide-angle conversion lens system.

At first, in FIGS. 1(A) to 1(C), in the order from front to rear, 1 is a first lens unit having a positive refractive power and made of glass material, 2 is a second lens unit made of plastic material by injection-molding means or the like and whose power has the smallest absolute value, and 3 is a third lens unit of negative refractive power made of glass material.

At least three lens surfaces, i.e., both lens surfaces of the first lens unit 1 and the front lens surface 2*a* of the second lens unit 2, constitute a front lens unit of positive refractive power, and at least three lens surfaces, i.e., the rear lens surface 2*b* of the second lens unit 2 and both lens surfaces of the third lens unit 3, constitute a rear lens unit of negative refractive power, the whole of them constituting an afocal system.

Next, FIG. 2(A) to 2(C) illustrates a wide-angle conversion lens. 10 is a first lens unit having a negative refractive power and made of glass material, 20 is a second lens unit made of plastic material by injection-molding means or the like and whose power has a smallest absolute value, and 30 is a third lens unit of positive refractive power made of glass material.

At least three lens surfaces, i.e., both lens surfaces of the first lens unit 10 and the front lens surface 20*a* of the second lens unit 20, constitute a front lens unit of negative refractive power, and at least three lens surfaces, i.e., the rear lens surface 20*b* of the second lens unit 20 and both lens surfaces of the third lens unit 30, constitute a rear lens unit of positive refractive power, the whole of them constituting an afocal system.

In this embodiment, in order to well correct all aberrations, particularly lateral chromatic aberration, in such a manner that a great reduction of the weight of the entire lens system is achieved, it is preferred to set forth the following relationship:

$$0.5<D/L<0.85 \quad (1)$$

where D is the axial thickness of the second lens unit, and L is the physical length of the conversion lens from the first lens surface to the last one.

When the thickness of the second lens unit is too thin beyond the lower limit of the inequalities of condition (1), lateral chromatic aberration becomes difficult to correct well. When it becomes too thick beyond the upper limit, the diameter of the first lens unit is increased, and, therefore, the weight of the whole of the lens system is increased objectionably.

In particular, for a second lens unit in the meniscus form of rearward convexity as shown in FIG. 1(C), it is desirable to satisfy:

$$0.5<D/L<0.8.$$

Also for another second lens unit in the bi-concave form as shown in FIG. 2(C), it is desirable to satisfy:

$$0.5<D/L<0.75$$

Discussion is next conducted with respect to each of the specific conversion lenses. In the specific example of FIG. 1(A), both surfaces of the second lens unit 2 are formed to convex shapes. This allows for the positive refractive power of the front lens unit to be dividedly borne on the three lens surfaces with an advantage of weakening of the curvature of each of all the constituent lens surfaces, and reducing the amount of aberrations for each lens surface. Also, the axial thickness of the first lens unit 1 is reduced to achieve a reduction of the weight of the entire lens system. And, the rear surface of the second lens unit 2 in the convex form of positive refractive power produces aberrations which cancel the various aberrations produced from the third lens unit 3 of negative refractive power. Hence, as a whole, good correction of aberrations is made.

Further, in this example, to preserve good optical performance when the telephoto conversion lens is attached, it is desirable that both lens surfaces of the first lens unit are made convex, and the third lens unit is constructed with both surfaces in concave form.

In another specific example shown in FIG. 1(B), the second lens unit 2 is constructed from a meniscus-shaped lens convex toward the front to allow for the positive refractive power of the front lens unit to be dividedly borne on the three lens surfaces. The curvature of each lens surface is weakened, and the amount of aberrations for each lens surface is lessened. Further, in this example, to preserve good optical performance when the telephoto conversion lens is attached, it is desirable that the first lens unit 1 is constructed in the meniscus form convex toward the front, and the third lens unit 3 with both surfaces thereof in the concave form.

In another specific example shown in FIG. 1(C), the second lens unit 2 is constructed from a meniscus-shaped lens convex toward the rear. Thereby, the various aberrations produced from the first lens unit 1 of positive refractive power are cancelled by the lens surface 2*a* of negative refractive power concave toward the front which is part of the front lens unit of positive refractive power. Similarly, the various aberrations to be produced from the third lens unit 3 of negative refractive power are cancelled by the rear lens surface 2*b* of positive refractive power convex toward the rear which is part of the rear lens unit of negative refractive power. Thus, in the overall view, the various aberrations are corrected in good balance, and each of the glass first and third lens units or groups define a partial air space with the plastic second lens unit.

Further, in this example, in order to maintain good stability of optical performance when the telephoto conversion lens is attached, it is desirable that both lens surfaces of the first lens unit 1 are made convex, and both lens surfaces of the third lens unit 3 are constructed in concave form.

In another example shown in FIG. 2(A), the second lens unit 20 is constructed from a menisus-shaped lens convex toward the rear to allow the negative refractive power of the front lens unit to be dividedly borne on the three lens surfaces. This enables the curvature of each lens surface to be weakened and the amount of aberrations for each surface to be lessened.

Also, the rear lens surface 20*b* of the second lens unit 20 is made convex so that, similarly to the front lens unit, the positive refractive power of the rear lens unit is dividedly borne on the three lens surfaces to minimize the amount of various aberrations produced from the whole of the rear lens unit.

Further, in this example, in order to maintain good stability of optical performance when the wide conversion lens is attached, it is preferred that the first lens unit 10 is constructed in the meniscus form convex toward the front, and the third lens unit 30 too in the meniscus form convex toward the front.

In another example shown in FIG. 2(B), the second lens unit 20 is constructed from a meniscus-shaped lens convex toward the front. Thereby, the various aberrations produced from the first lens unit 10 of negative refractive power are cancelled by the front lens surface 20*a* of positive refractive power convex toward the front which is part of the front lens unit of negative refractive power. Similarly, the various aberrations to be produced from the third lens unit 30 of positive refractive power are to be cancelled by the rear lens surface 20*b* of negative refractive power concave toward the rear which is part of the rear lens unit of positive refractive power. Thus, over the entire system, the various aberrations are corrected in good balance.

Further, in this example, in order to maintain good stability of optical performance when the wide-angle conversion lens is attached, it is desirable that the first lens unit 10 is constructed with both lens surfaces thereof in the concave form, and the third lens unit 30 with both lens surfaces thereof in the convex form.

In another example shown in FIG. 2(C), the second lens unit 20 is constructed with both lens surfaces thereof in the concave form to allow the negative refractive power of the front lens unit to be dividedly borne on at least three of its lens surfaces. This enables the curvature of each of all the lens surfaces to be weakened and the amount of aberrations for each surface to be lessened.

Also, the rear lens surface of the second lens unit 20 is made concave to cancel the aberrations to be produced from the rear lens unit of positive refractive power, and to minimize the amount of aberrations produced from the whole of the rear lens unit.

Further, in this example, in order to maintain good stability of optical performance, it is desirable that the first lens unit 10 is constructed in the meniscus form convex toward the front, and the third lens unit 30 with both lens surfaces thereof in the convex form.

Figure 3:
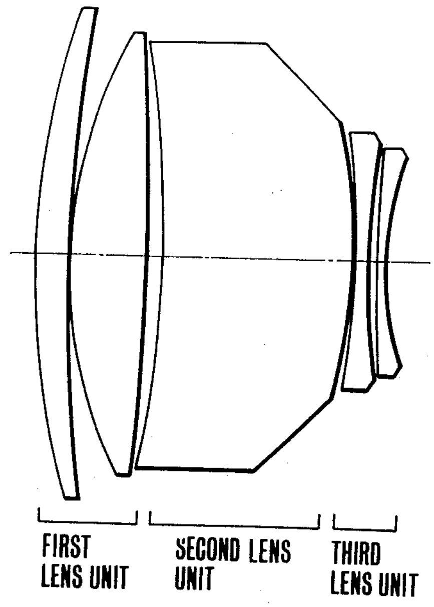
FIG. 3 is a longitudinal section view of another embodiment of the conversion lens according to the invention.

Note, though, that the above-described embodiment, as the first lens unit or the third lens unit, use is made of only one lens element for the purpose of convenience, it is needless to say that either or both of them may be constructed from a plurality of lens elements as shown in FIG. 3 for another embodiment of the conversion lens. Even in this case, the objects of the invention can be accomplished.

It is also to be noted in connection with FIG. 3 that the first lens unit consists of, from front to rear, a meniscus lens of positive refractive power convex toward the front and a bi-convex lens, the second lens unit consists of a meniscus lens concave toward the front, and the third lens unit consists of a bi-concave lens and a meniscus lens of negative refractive power convex toward the front.

By such construction and arrangement and form of both front and rear lens units with inclusion of at least three lens surfaces, as compared with the 2-element conversion lens, the number of lens surfaces is increased to facilitate aberration correction.

Another feature is that the space between the front and rear lens units is filled with the plastic material of the second lens unit. This gives an advantage that the weight is reduced to about ½ or less in comparison with when it is filled with glass material. Thus, a great reduction of the weight of the lens system as a whole has been achieved.

Another advantage is to make easy good correction of chromatic aberrations, particularly lateral aberration, when the conversion lens is attached.

Still another advantage arising from the location of the plastic or second lens unit in between the glass or first and third lens units is that the second lens unit has no exposed lens surface to be accessible from the outside. Despite frequent dusting frequently carried carried out, the possibility of leaving scars on the lens surface is remarkably reduced. Thus, the optical performance is prevented from being lowered.

Further, because the change of the temperature and humidity of the atmosphere is prevented from directly influencing the second lens unit, a photographic system stable against the change of the atmospheric conditions can be established with the conversion lens of the invention.

Still another feature of the invention is that the front and rear lens units are provided with lens surfaces of opposite refracting power to each other and, in this case, by setting forth a proper range for the Abbe number of the material of the lens element, the front and rear lens units each can be made an achromat.

That is, letting the equivalent values of the Abbe number of the first and third lens units be denoted by $\upsilon_1$ and $\upsilon_3$ respectively and the value of the Abbe number of the second lens unit by $\upsilon_2$, it is desirable to satisfy the following conditions:

$$\upsilon_1 > \upsilon_2,\ \upsilon_3 > \upsilon_2$$

Here, the equivalent value $\upsilon$ of Abbe number is defined by the following formula:

$$\frac{\Phi}{\upsilon} = \Sigma_i \frac{\phi i}{\upsilon i}$$

where $\Phi$ is the refracting power of the entire system, and $\phi i$ and $\upsilon i$ are respectively the refracting power and Abbe number of the i-th constituent lens element in each lens unit.

In such a manner, in the embodiments of the invention, the value of the overall Abbe number of each lens unit is determined so as to satisfy those inequalities of condition. Hence, in each lens unit, separate achromatism is effected. Thus, good correction of chromatic aberrations is attained over the entire lens system.

The examples of the specific conversion lenses of the invention can be constructed in accordance with the numerical data given in tables below for the radii of curvature, R, the axial thicknesses or air separations, D, and the refractive indices, N, and the Abbe numbers, $\upsilon$, of the materials of the various lens elements with the subscripts numbered consecutively from front to rear.

Numerical Example 1 (FIG. 1(A)):

Numerical Example 1 (FIG. 1(A)):

| | | | |
|---|---|---|---|
| R 1 = 0.8514 | D 1 = 0.1 | N 1 = 1.51633 | ν1 = 64.1 |
| R 2 = −13.0387 | D 2 = 0.0015 | | |
| R 3 = 6.7527 | D 3 = 0.4424 | N 2 = 1.49171 | ν2 = 57.4 |
| R 4 = −2.3888 | D 4 = 0.03 | | |
| R 5 = −1.2983 | D 5 = 0.02 | N 3 = 1.58267 | ν3 = 46.4 |
| R 6 = 0.7645 | | | |

Afocal Magnification: 1.40
2nd Lens Unit made of Methyl Methacrylate
D/L = 0.745

Numerical Example 2 (FIG. 1(B)):

Numerical Example 2 (FIG. 1(B)):

| | | | |
|---|---|---|---|
| R 1 = 1.0012 | D 1 = 0.1 | N 1 = 1.51633 | ν1 = 64.1 |
| R 2 = 5.5967 | D 2 = 0.0015 | | |
| R 3 = 1.65 | D 3 = 1.4719 | N 2 = 1.49171 | ν2 = 57.4 |
| R 4 = 3.65 | D 4 = 0.03 | | |
| R 5 = −4.8439 | D 5 = 0.02 | N 3 = 1.58267 | ν3 = 46.4 |
| R 6 = 0.7883 | | | |

Afocal Magnification: 1.40
2nd Lens Unit made of Methyl Methacrylate
D/L = 0.757

Numerical Example 3 (FIG. 1(C)):

Numerical Example 3 (FIG. 1 (C)):

| | | | |
|---|---|---|---|
| R 1 = 0.7309 | D 1 = 0.15 | N 1 = 1.60311 | ν1 = 60.7 |
| R 2 = −2.6270 | D 2 = 0.015 | | |
| R 3 = −1.6400 | D 3 = 0.3823 | N 2 = 1.5835 | ν2 = 29.85 |
| R 4 = −1.1900 | D 4 = 0.01 | | |
| R 5 = −1.4931 | D 5 = 0.02 | N 3 = 1.60311 | ν3 = 60.7 |
| R 6 = 0.5508 | | | |

Afocal Magnification: 1.40
2nd Lens Unit made of Polycarbonate
D/L = 0.662

Numerical Example 4 (FIG. 2(A)):

Numerical Example 4 (FIG. 2(A)):

| | | | |
|---|---|---|---|
| R 1 = 0.8859 | D 1 = 0.03 | N 1 = 1.60311 | ν1 = 60.7 |

-continued

| Numerical Example 4 (FIG. 2(A)): | | | |
|---|---|---|---|
| R 2 = 0.4501 | D 2 = 1.1356 | | |
| R 3 = −1.476 | D 3 = 0.49 | N 2 = 1.49171 | ν2 = 57.4 |
| R 4 = −2.066 | D 4 = 0.0015 | | |
| R 5 = 0.8439 | D 5 = 0.03 | N 3 = 1.51633 | ν3 = 64.1 |
| R 6 = 3.7497 | | | |

Afocal Magnification: 0.714
2nd Lens Unit made of Methyl Methacrylate
D/L = 0.713

Numerical Example 5 (FIG. 2(B)):

| Numerical Example 5 (FIG. 2(B)): | | | |
|---|---|---|---|
| R 1 = −3.2465 | D 1 = 0.03 | N 1 = 1.60311 | ν1 = 60.7 |
| R 2 = 0.4452 | D 2 = 0.07 | | |
| R 3 = Aspheric | D 3 = 0.4029 | N 2 = 1.5835 | ν2 = 29.85 |
| R 4 = Aspheric | D 4 = 0.01 | | |
| R 5 = 0.9227 | D 5 = 0.045 | N 3 = 1.51633 | ν3 = 64.1 |
| R 6 = −1.0940 | | | |

Afocal Magnification: 0.714
2nd Lens Unit made of Polycarbonate
D/L = 0.722

Equation for R3 or R4:

$$X = \frac{y^2/Ri}{1 + \sqrt{1 - (y/Ri)^2}} + Aiy^2 + Biy^4 + Ciy^6 + Diy^8 + Eiy^{10}$$

Whence

| | | |
|---|---|---|
| R 3 = 1.19 | A 3 = 0 | B 3 = 9.96089 × $10^{-4}$ |
| C 3 = 7.30163 × $10^{-5}$ | D 3 = 0 | E 3 = 0 |
| R 4 = 1.84 | A 4 = 0 | B 4 = −8.3754 × $10^{-5}$ |
| C 4 = 6.49051 × $10^{-5}$ | D 4 = 0 | E 4 = 0 |

Numerical Example 6 (FIG. 2(C)):

| Numerical Example 6 (FIG. 2(C)): | | | |
|---|---|---|---|
| R 1 = 0.8464 | D 1 = 0.03 | N 1 = 1.58913 | ν1 = 61.0 |
| R 2 = 0.3981 | D 2 = 0.15 | | |
| R 3 = −2.3 | D 3 = 0.3982 | N 2 = 1.49171 | ν2 = 57.4 |
| R 4 = 0.7933 | D 4 = 0.0015 | | |
| R 5 = 0.63339 | D 5 = 0.06 | N 3 = 1.51823 | ν3 = 59.0 |
| R 6 = −0.9978 | | | |

Afocal Magnification: 0.714
2nd Lens Unit made of Methyl Methacrylate
D/L = 0.622

Numerical Example 7 (FIG. 3):

| Numerical Example 7 (FIG. 3): | | | |
|---|---|---|---|
| R 1 = 1.3813 | D 1 = 0.055 | N 1 = 1.59813 | ν1 = 61.2 |
| R 2 = 2.9382 | D 2 = 0.002 | | |
| R 3 = 0.7730 | D 3 = 0.130 | N 2 = 1.51633 | ν2 = 64.1 |
| R 4 = −4.1403 | D 4 = 0.023 | | |
| R 5 = −1.8084 | D 5 = 0.317 | N 3 = 1.58350 | ν3 = 29.85 |
| R 6 = −0.9626 | D 6 = 0.002 | | |
| R 7 = −1.4874 | D 7 = 0.020 | N 4 = 1.58913 | ν4 = 61.2 |
| R 8 = 1.5450 | D 8 = 0.014 | | |
| R 9 = 3.6848 | D 9 = 0.015 | N 5 = 1.51633 | ν5 = 64.1 |
| R 10 = 0.5313 | | | |

Afocal Magnification: 1.40
2nd Lens Unit made up of Polycarbonate
D/L = 0.548
$\nu_1 = 63.43$
$\nu_3 = 62.67$
$\nu_1 > \nu_2$
$\nu_3 > \nu_2$

What is claimed is:

1. A conversion lens comprising, from front to rear:

a first lens unit or group made of glass material;

a second lens unit or group made of plastic material; and a third lens unit or group made of glass material said lens units or groups being separated from each other with at least a partial air space therebetween.

2. A conversion lens according to claim 1, wherein said first lens unit or group has a positive refractive power, and said third lens unit or group has a negative refractive power said lens units or groups being separated from each other with at least a partial air space therebetween.

3. A conversion lens according to claim 1, wherein said first lens unit has a negative refractive power, and said third lens unit has a positive refractive power.

4. A conversion lens according to claim 1, satisfying the following condition:

$$0.5 < D/L < 0.85$$

where D is the distance from the frontmost lens surface of said second lens unit to the rearmost lens surface thereof, and L is the distance from the frontmost lens surface of said first lens unit to the rearmost lens surface of said third lens unit.

5. A conversion lens according to claim 2, wherein said first lens unit has a lens of meniscus form convex toward the front, said second lens unit has a bi-convex lens, and said third lens unit has a bi-concave lens.

6. A conversion lens according to claim 2, wherein said first lens unit has a lens of meniscus form convex toward the front, said second lens unit has a lens of meniscus form convex toward the front, and said third lens unit has a bi-concave lens.

7. A conversion lens according to claim 2, wherein said first lens unit has a bi-convex lens, said second lens unit has a lens of meniscus form convex toward the rear, and said third lens unit has a bi-concave lens.

8. A conversion lens according to claim 3, wherein said first lens unit has a lens of meniscus form convex toward the front, said second lens unit has a lens of meniscus form convex toward the rear, and said third lens unit has a lens whose front surface is convex toward the front.

9. A conversion lens according to claim 3, wherein said first lens unit has a bi-concave lens, said second lens unit has a lens of meniscus form convex toward the front, and said third lens unit has a bi-convex lens.

10. A conversion lens according to claim 3, wherein said first lens unit has a lens whose front surface is convex toward the front, said second lens unit has a bi-concave lens, and said third lens unit has a bi-convex lens.

11. A conversion lens according to claim 1, satisfying the following condition:

$$\nu_1 > \nu_2,\ \nu_3 > \nu_2$$

where $\upsilon_1$ and $\upsilon_3$ are respectively the equivalent values of Abbe number of said first and said third lens units, and $\upsilon_2$ is the value of Abbe number of said second lens unit, and $\upsilon k$ can be expressed by the following formula:

$$\Phi/\upsilon k=\Sigma\phi i/\upsilon i$$

where $\Phi$ is the refractive power of the entire lens system, and $\phi i$ and $\upsilon i$ are respectively the refractive power and Abbe number of the material of the i-th constituent lens element in the k-th lens unit.

12. A front conversion lens comprising a front lens unit made of glass material, an intermediate lens unit made of plastic material and having the largest thickness of said front conversion lens and a rear lens unit made of glass material.

13. A front conversion lens according to claim 12, wherein said front lens unit has a positive refractive power, and said rear lens unit has a negative refractive power.

14. A front conversion lens according to claim 12, wherein said front lens unit has a negative refractive power, and said rear lens unit has a positive refractive power.

15. A front conversion lens according to claim 12, satisfying the following condition:

$$0.5<D/L<0.85$$

where D is the distance from the frontmost lens surface of said intermediate lens unit to the rearmost lens surface thereof, and L is the distance from the frontmost lens surface of said front lens unit to the rearmost lens surface of said rear lens unit.

16. A conversion lens comprising, from front to rear:

a first lens unit or group made of glass material;

a second lens unit or group made of plastic material;

a third lens unit or group made of glass material said lens units or groups being separated from each other with at least a partial air space therebetween, and satisfying the following condition:

$$0.5<D/L<0.85$$

where D is the distance from the frontmost lens surface of said second lens unit or group to the rearmost lens surface thereof, and L is the distance from the frontmost lens surface of said first lens unit or group to the rearmost lens surface of said third lens unit or group.

17. A conversion lens according to claim 16, satisfying the following condition:

$$\upsilon_1>\upsilon_2,\ \upsilon_3>\upsilon_2$$

where $\upsilon_1$ and $\upsilon_3$ are respectively the equivalent values of Abbe number of said first and said third lens units, and $\upsilon_2$ is the value of Abbe number of said second lens unit, and $\upsilon k$ can be expressed by the following formula:

$$\Phi/\upsilon k=\Sigma\phi i/\upsilon i$$

wherein $\Phi$ is the refractive power of the entire lens system, and $\phi i$ are respectively the refractive power and Abbe number of the material of the i-th constituent lens element in the k-th lens unit.

* * * * *

UNITED STATES PATENT AND TRADEMARK OFFICE
CERTIFICATE OF CORRECTION

PATENT NO. : 4,929,068

DATED : May 29, 1990

INVENTOR(S) : Tsuji

It is certified that error appears in the above-identified patent and that said Letters Patent is hereby corrected as shown below:

Column 1:

Line 67, "since as" should read --since, as--.

Column 2:

Line 9, "lens" should read --lens,--.

Line 12, "is" should be deleted.

Line 16, "third lens" should read --third lens unit--.

Line 56, "FIG. 2(A) to 2(C) illustrates" should read --FIGS. 2(A) to 2(C) illustrate--.

Line 60, "a" should read --the--.

Column 4:

Line 20, "menisus-shaped" should read --meniscus-shaped--.

Line 48, "to be" should be deleted.

UNITED STATES PATENT AND TRADEMARK OFFICE
CERTIFICATE OF CORRECTION

PATENT NO. : 4,929,068 Page 2 of 4

DATED : May 29, 1990

INVENTOR(S) : Tsuji

It is certified that error appears in the above-identified patent and that said Letters Patent is hereby corrected as shown below:

Column 5:

Line 9, "that the" should read --that in the--.

Line 45, "dusting frequently carried carried" should read --dusting--.

Line 46, "out," should be deleted.

Line 62, "$\upsilon_1$" should read --$\bar{\upsilon}_1$--.

Line 63, "and $\upsilon_3$" should read --and $\bar{\upsilon}_3$--.

Line 67, "$\upsilon_1 > \upsilon_2$, $\upsilon_3 > \upsilon_2$" should read --$\bar{\upsilon}_1 > \upsilon_2$, $\bar{\upsilon}_3 > \upsilon_2$--.

Column 8:

Line 16, "material said" should read --material, said--.

Line 22, "power said" should read --power, said--.

Line 68, "$\upsilon_1 > \upsilon_2$, $\upsilon_3 > \upsilon_2$" should read --$\bar{\upsilon}_1 > \upsilon_2$, $\bar{\upsilon}_3 > \upsilon_2$--.

UNITED STATES PATENT AND TRADEMARK OFFICE

CERTIFICATE OF CORRECTION

PATENT NO. : 4,929,068 Page 3 of 4

DATED : May 29, 1990

INVENTOR(S) : Tsuji

It is certified that error appears in the above-identified patent and that said Letters Patent is hereby corrected as shown below:

Column 9:

Line 1, "$\upsilon_1$ and $\upsilon_3$ should read --$\tilde{\upsilon}_1$ and $\tilde{\upsilon}_3$--.

Line 5, "$\upsilon k$" should read --$\tilde{\upsilon} k$--.

Line 7, "$\Phi/\upsilon k = \Sigma\phi i/\upsilon i$" should read --$\Phi/\tilde{\upsilon} k = \Sigma\phi i/\upsilon i$--.

Column 10:

Line 6, "material said" should read 0--material, said--.

Line 20, "$\upsilon_1 > \upsilon_2$, $\upsilon_3 > \upsilon_2$" should read --$\tilde{\upsilon}_1 > \upsilon_2$, $\tilde{\upsilon}_3 > \upsilon_2$--.

Line 22, "$\upsilon_1$ and $\upsilon_3$ should read --$\tilde{\upsilon}_1$ and $\tilde{\upsilon}_3$--.

Line 25, "$\upsilon k$" should read --$\tilde{\upsilon} k$--.

Line 27, "$\Phi/\upsilon k = \Sigma\phi i/\upsilon i$" should read --$\Phi/\tilde{\upsilon} k = \Sigma\phi i/\upsilon i$--.

UNITED STATES PATENT AND TRADEMARK OFFICE

CERTIFICATE OF CORRECTION

PATENT NO. : 4,929,068

DATED : May 29, 1990

INVENTOR(S) :

It is certified that error appears in the above-identified patent and that said Letters Patent is hereby corrected as shown below:

Column 10:

Line 30, "$\phi i$ are" should read --$\phi i$ and $\upsilon i$ are--.

Signed and Sealed this

Twenty-third Day of June, 1992

*Attest:*

DOUGLAS B. COMER

*Attesting Officer*

*Acting Commissioner of Patents and Trademarks*